J. W. Drummond,
Chair Bottom,
№ 8,585. Patented Dec. 16, 1851.
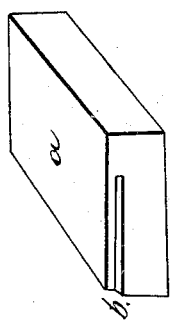
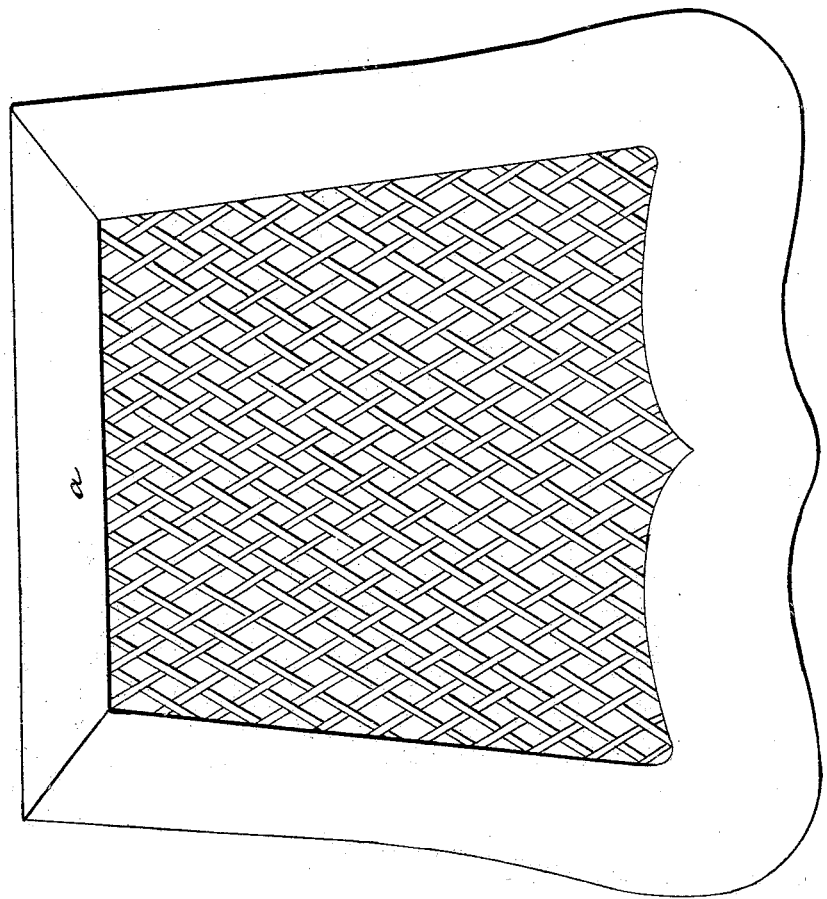

UNITED STATES PATENT OFFICE.

JOHN W. DRUMMOND, OF SKANEATELES, NEW YORK, ASSIGNOR TO SMITH ELY, OF NEW BRIGHTON, NEW YORK.

CHAIR-SEAT.

Specification of Letters Patent No. 8,585, dated December 16, 1851.

*To all whom it may concern:*

Be it known that I, JOHN W. DRUMMOND, of the town of Skaneateles, county of Onondaga, and State of New York, have invented a new and useful Improvement in the Manufacture of Chair-Seats and other Articles of Like Fabric and Texture, of which the following is a description, reference being had also to the drawings which accompany the same, in which—

Figure 1, is a plan of the seat; Fig. 2, a portion of the frame.

A frame of the desired size and fashion is prepared and put together in any of the modes in use; the parts *a* of the frame however before being put together are grooved on their inner edges, about one sixteenth of an inch from the upper surface of the frame as at (*b*) Fig. 2; the groove to be made about three fourths of an inch deep and of sufficient width to receive the material to be set in the frame of which the seat or other article to be made is composed. The material set in the frame is composed of narrow strips or fibers of cane or other material of sufficient strength and suitable texture for the purpose. These strips or fibers are to be of sufficient length when woven together and in the frame to reach the bottom of the grooves. They are then to be formed into a web of open work in any desired fashion either as they are separately placed in the frame—or the web is made complete and then slipped into the frame, entering the grooves and extending to the bottom of them. The webbing or other material is to be secured in the grooves by glue or otherwise.

This improvement is particularly applicable to chair seats and to other articles which are composed of a frame and a webbing within the frame, made from narrow strips of wood or other material.

What I claim as my invention and desire to secure by Letters Patent is—

The above combination of the frame and web being the mode of securing the web to the frame by gluing or cementing the web into a groove in the frame as herein set forth.

June twenty third 1851.

JOHN W. DRUMMOND.

Witnesses:
GEO. C. GODDARD,
LEONARD W. GODDARD.